Dec. 19, 1950   R. J. DIEKER   2,534,661
VAPORIZER
Filed Nov. 30, 1945

INVENTOR
ROBERT J. DIEKER.

ATTORNEYS

UNITED STATES PATENT OFFICE 2,534,661

VAPORIZER

Robert J. Dieker, St. Louis, Mo.

Application November 30, 1945, Serial No. 631,901

1 Claim. (Cl. 261—69)

The invention generally relates to vaporizers for use in connection with internal combustion engines for the purpose of delivering aqueous vapor into the cylinders thereof, with the gaseous fuel charges delivered thereto from the carburetor, thereby to effect full economy and more efficient operation of the engine.

The vapor which is used may consist of water or of a mixture of alcohol and water. The use of such vapor in conjunction with the gaseous fuel charge delivered to the engine involves many advantages.

It is an object of the invention to increase fuel economy in gasoline engines by utilizing injected water to remove heat from cylinders, pistons and spark plug points which would otherwise have to be removed by the normal engine cooling system. Such heat is discharged from the engine by the exhaust system of the engine in the form of steam. Since it is well known that the process of conversion of water into steam will absorb a great quantity of heat per unit mass of water, cooling of the engine is materially assisted, thereby causing increase of fuel economy.

It is a further object of the invention to increase the possible power output of a given engine by reducing the tendency to pre-ignition caused by overheat.

It is a still further object of the invention to provide a supply of water or water-alcohol mixture at such times only as such a supply can be used to advantage, which is conceived to be when the engine is under load, at which time the vacuum in the intake manifold of the engine is reduced.

It is a still further object of the invention to provide a new and improved construction of vaporizer, which may be readily attached in cooperative relation to the coacting engine parts, and which, when so applied will automatically supply just the amount of aqueous vapour needed by the engine to effect the most efficient running thereof under various conditions.

Figure 1:
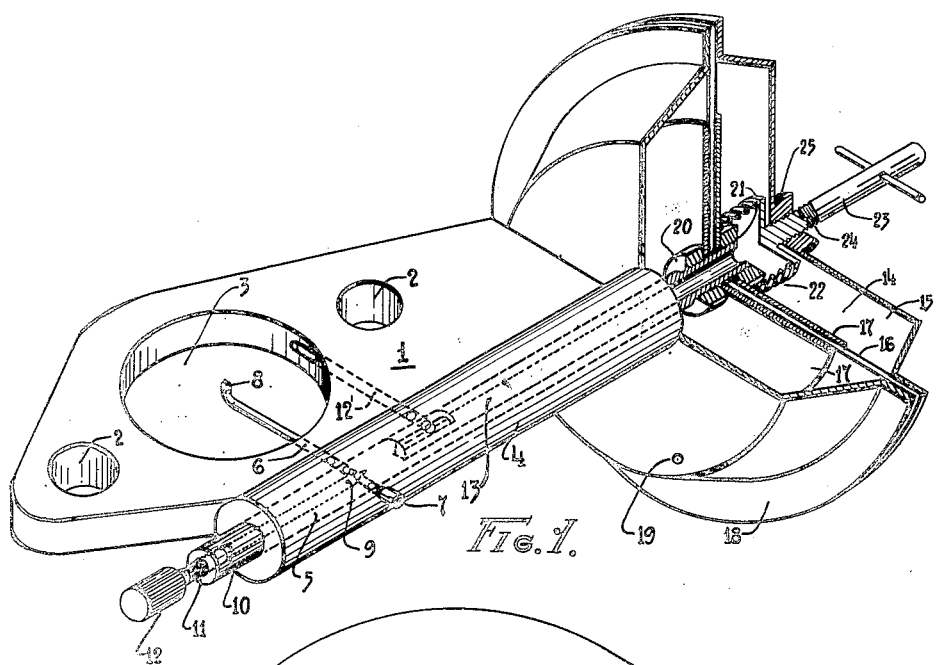
Figure 2:
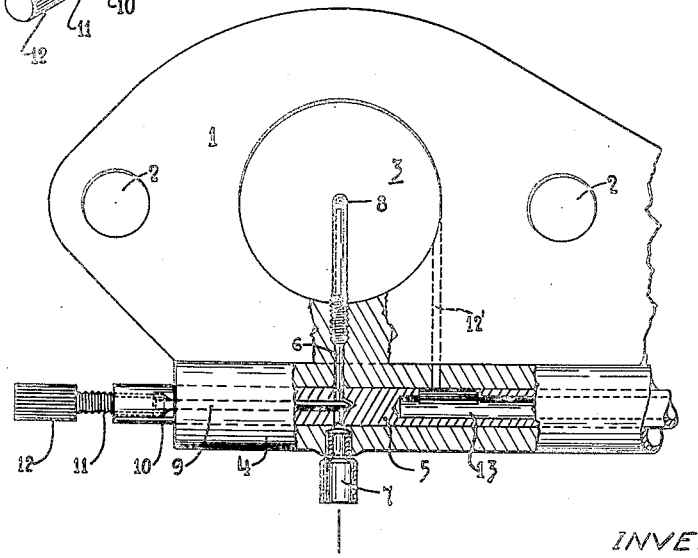

With the above and other objects in view, the invention resides in the novel details of construction, combination and arrangement of parts, as described in the following specification, and particularly pointed out in the appended claim, reference being had to the accompanying drawings, in which the same numerals of reference apply to similar parts throughout the figures and views, and wherein:

Figure 1 represents a perspective view of my invention, partly in section to show internal details; and Figure 2 represents a plan view of a portion of the invention, partly in section.

Referring to the drawings, numeral 1 represents a mounting flange for the specific embodiment of the invention herein described, and which is adapted to be bolted between the carburetor and intake manifold of a gasoline engine (not shown) by means of bolt holes 2, hole 3 representing a passage for the fuel mixture from the carburetor to the intake manifold.

Integral with the flange 1 is provided a cylindrical valve means 4 having internally thereof, and extending co-axially therewith a sliding valve 5. Sliding valve 5 extends externally of valve means 4 at each end for a short distance.

Extending transversely of the valve means 4, 5 is a passageway 6 for water or water-alcohol solution to be provided to the engine utilizing my novel device. Passageway 6 is provided with water or water-alcohol solution at a pressure of approximately five (5) pounds per square inch, from a source which is not illustrated, the water entering passageway 6 at connecting fitting 7, and leaving via jet 8, disposed within the passageway 3. The water or solution provided by jet 8 is carried with the fuel mixture from the carburetor to the cylinders via the intake manifold of the engine.

Carried by the sliding valve 5 and extending axially thereinto at one end is a needle valve 9, positionable with respect to the sliding valve 5 by means of a screw 11, which threadably engages a threaded aperture 10. The position of the needle valve 9 relative to the sliding valve 5 is readily adjustable by means of the thumbnut 12. Needle valve 9 is required as a means of adjustment of water flow due to the various rates of flow and mixtures required by different engines, or in the same engine when utilized in various climates.

Extending from hole 3 is a passage 12' which conveys vacuum or suction from the intake manifold via passageway 13 internally of the sliding valve 5 and thence to a pressure chamber 14 formed by a rigid wall 15 and a diaphragm assembly consisting of a neoprene diaphragm 16 stiffened by metal plates 17 secured to opposite faces of the diaphragm 16. Diaphragm 16 is normally held in one extreme position, in the absence of suction in chamber 14, by means of compression spring 22, but the position taken by said diaphragm is modifiable in response to creation of a vacuum in chamber 14, since the face of diaphragm 16 which is external to the chamber 14 is exposed to atmospheric pressure via port 19.

Sliding valve 5 is threaded at the end opposite to that containing the needle valve and is secured to the diaphragm 16 by two lock nuts 20, 21, which engage the threaded portion of the sliding valve 5, one on the pressure side of the diaphragm and the other on the vacuum side of the diaphragm.

The compression normally existing in spring 22 may be adjusted by means of adjusting screw 23, having threaded portion 24 which engages a drilled and internally threaded boss 25 which is secured to wall 15 of chamber 14.

In the operation of my device, in the absence of suction in the intake manifold, which occurs whenever the motor is stopped, spring 22 forces diaphragm 16 leftwardly which moves the valve 5 secured thereto in a similar manner causing the sliding valve entirely to prevent flow of liquid in passageway 6.

When the vacuum in the intake manifold is high, because the engine is delivering low or normal torque, the differential of pressure between atmospheric and that existing in chamber 14 is sufficient to overcome the compression of the spring and to force sliding valve 5 rightwardly a sufficient amount completely to close the passageway 6.

However, when the engine is laboring, and the vacuum consequently has a relatively low value, the diaphragm 16 and consequently the sliding valve 5 takes up a position such that liquid will flow in passageway 6, the rate of flow depending on the precise pressure existing in chamber 14, as well as upon the adjustment of needle valve 9, and spring control screw 23.

What I claim is:

A vaporizer for internal combustion engines comprising a tubular valve casing provided with a horizontal fluid passage extending transversely therethrough, a horizontally disposed flange provided with a centrally located aperture and diametrically opposed bolt-receiving holes integrally formed on said casing and adapted to be positioned betwen a carburetor and an intake manifold, an injector extending from the inner extremity of the fluid passage into the aperture in the flange, an angularly disposed extremity on the injector adapted to project into the intake manifold, a cylindrical valve element longitudinally reciprocable in said valve casing for opening, closing and adjusting the area of said fluid passage, a manually adjustable needle valve axially mounted in one extremity of the valve element for controlling the area of the fluid passage, a diaphragm secured to the other extremity of the valve element, a housing enclosing said diaphragm and divided thereby, a vacuum connection from the intake manifold of the engine to the housing at the side of the diaphragm farthest removed from the valve casing, said vacuum connection comprising a centrally located longitudinal bore in the cylindrical valve element having connection with a transverse bore in the valve casing and integral flange, resilient means for holding the diaphragm against the vacuum, and means for manually adjusting said resilient means.

ROBERT J. DIEKER.

REFERENCES CITED

The following references are of record in the file of this patent:

UNITED STATES PATENTS

| Number | Name | Date |
| --- | --- | --- |
| 1,061,582 | Clement | May 13, 1913 |
| 1,228,157 | Wyand | May 29, 1917 |
| 1,264,764 | Block | Apr. 30, 1918 |
| 1,704,832 | Higgins, Jr. | Mar. 12, 1929 |
| 1,924,595 | Chandler | Aug. 25, 1933 |
| 2,188,175 | Condon | Jan. 23, 1940 |
| 2,321,211 | Johnson | June 8, 1943 |
| 2,441,301 | Waag et al. | May 11, 1948 |